(12) United States Patent
Lee

(10) Patent No.: US 11,030,971 B2
(45) Date of Patent: Jun. 8, 2021

(54) DISPLAY DEVICE AND IMAGE PROCESSING METHOD FOR COLOR CORRECTION BASED ON IMAGE TYPE

(71) Applicant: SAMSUNG DISPLAY CO., LTD., Yongin-si (KR)

(72) Inventor: Kyung Hun Lee, Yongin-si (KR)

(73) Assignee: SAMSUNG DISPLAY CO., LTD., Yongin-si (KR)

( * ) Notice: Subject to any disclaimer, the term of this patent is extended or adjusted under 35 U.S.C. 154(b) by 135 days.

(21) Appl. No.: 16/361,507

(22) Filed: Mar. 22, 2019

(65) Prior Publication Data

US 2020/0035194 A1      Jan. 30, 2020

(30) Foreign Application Priority Data

Jul. 30, 2018   (KR) .................. 10-2018-0088694

(51) Int. Cl.
*G06K 9/46* (2006.01)
*G06K 9/62* (2006.01)
(Continued)

(52) U.S. Cl.
CPC ............ *G09G 5/02* (2013.01); *G06K 9/4604* (2013.01); *G06K 9/6212* (2013.01); *G06K 15/1878* (2013.01); *G06T 7/13* (2017.01); *G06T 7/90* (2017.01); *G06T 2207/10024* (2013.01); *G09G 2320/0242* (2013.01); (Continued)

(58) Field of Classification Search
CPC ................. G09G 3/2003; G09G 5/02; G09G 2320/0242; G09G 2320/0613; G09G 2320/0666; G09G 2320/10; G09G 2340/06; G06T 5/40; G06T 7/13; G06T 7/90;
(Continued)

(56) References Cited

U.S. PATENT DOCUMENTS 5,848,185 A * 12/1998 Koga ................ G06T 3/40
382/173
6,362,808 B1 * 3/2002 Edge ................ H04N 1/6052
345/418
(Continued)

FOREIGN PATENT DOCUMENTS

| CN | 104299560 | 1/2015 |
|---|---|---|
| KR | 10-0932205 | 12/2009 |
| KR | 10-2017-0107635 | 9/2017 |

*Primary Examiner* — Yubin Hung
(74) *Attorney, Agent, or Firm* — F. Chau & Associates, LLC

(57) ABSTRACT

Provided herein are a display device and an image processing method thereof. The display device includes an image processor processing original image data including color coordinate values for R, G, and B components in an RGB color space, and output processed original image data as corrected image data, and a display unit outputting an image corresponding to the corrected image data, wherein the image processor sets a corrected color coordinate value for an arbitrary component of the R, G, and B components based on a type of the image, sets corrected color coordinate values for remaining components in accordance with the corrected color coordinate value for the arbitrary component, and generates the corrected image data based on the corrected color coordinate values for the arbitrary component and the remaining components.

18 Claims, 6 Drawing Sheets

(51) Int. Cl.
*G06K 15/02* (2006.01)
*G09G 5/02* (2006.01)
*G06T 7/13* (2017.01)
*G06T 7/90* (2017.01)

(52) U.S. Cl.
CPC ............. *G09G 2320/0666* (2013.01); *G09G 2320/10* (2013.01); *G09G 2340/06* (2013.01)

(58) Field of Classification Search
CPC .......... G06T 2207/10024; G06T 2207/20021; G06K 9/4604; G06K 9/6212; G06K 15/1878
See application file for complete search history.

(56) References Cited

U.S. PATENT DOCUMENTS

| | | | |
|---|---|---|---|
| 6,695,435 B1* | 2/2004 | Cheng | B41J 2/0451 |
| | | | 347/19 |
| 9,798,954 B1* | 10/2017 | Liu | G06K 9/6202 |
| 9,826,206 B2* | 11/2017 | Mochizuki | G09G 3/2003 |
| 10,002,577 B2 | 6/2018 | Liu et al. | |
| 10,410,092 B1* | 9/2019 | Chen | G01N 33/24 |
| 2005/0094098 A1* | 5/2005 | Morita | H05B 39/042 |
| | | | 351/203 |
| 2006/0158704 A1* | 7/2006 | Kameyama | H04N 1/628 |
| | | | 358/518 |
| 2010/0225238 A1* | 9/2010 | Medin | H04N 9/3155 |
| | | | 315/210 |
| 2013/0235067 A1* | 9/2013 | Cherna | G09G 5/026 |
| | | | 345/594 |
| 2016/0314586 A1* | 10/2016 | Lavigne | G06K 9/4652 |
| 2017/0069241 A1* | 3/2017 | Musgrave | G09G 3/2003 |
| 2017/0270359 A1* | 9/2017 | Ouchi | H04N 1/40062 |
| 2017/0278481 A1* | 9/2017 | Wang | G06T 19/006 |
| 2018/0089861 A1* | 3/2018 | Klement | G09G 3/2003 |

* cited by examiner

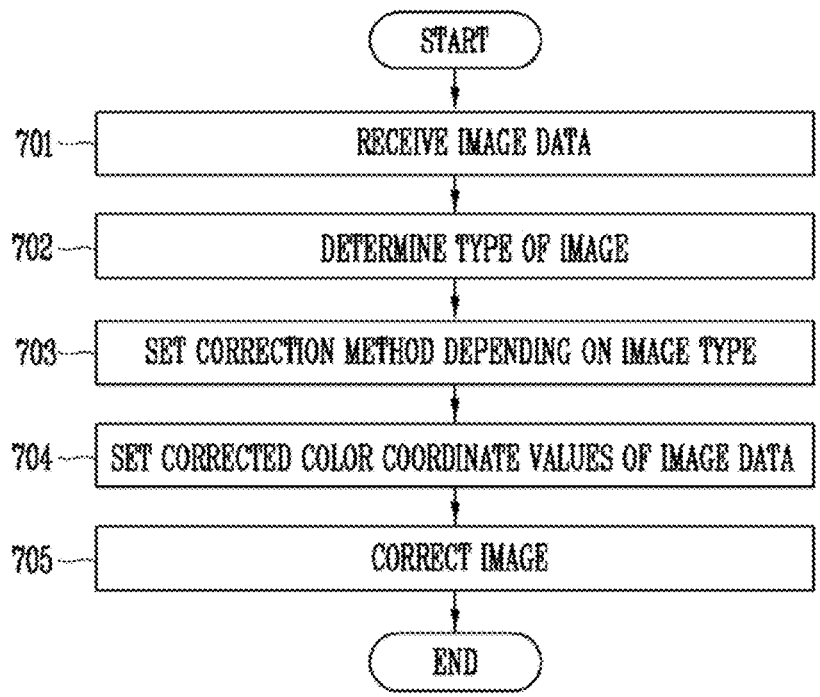
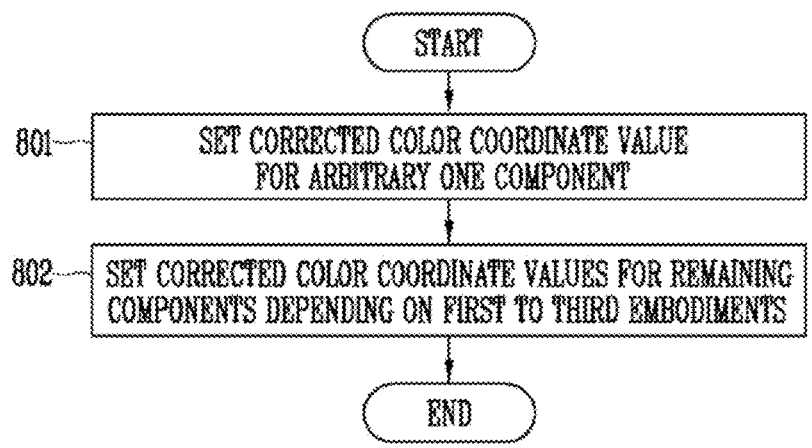

DISPLAY DEVICE AND IMAGE PROCESSING METHOD FOR COLOR CORRECTION BASED ON IMAGE TYPE

CROSS-REFERENCE TO RELATED APPLICATION

The present application claims priority to Korean patent application number 10-2018-0088694 filed on Jul. 30, 2018, the entire disclosure of which is incorporated herein in its entirety by reference.

BACKGROUND

1. Technical Field

Various embodiments of the present disclosure generally relate to a display device and an image processing method thereof, and more particularly, to a display device and an image processing method thereof which can represent an image in a desired color without deteriorating image quality and causing color distortion.

2. Related Art

In a display device such as a television (TV) or a monitor, a light source, such as a light-emitting diode (LED), is provided as a backlight for displaying an image. Such an LED light source tends to emit a higher level of blue light more than a fluorescent light, an incandescent light or a halogen lamp does. Exposure to such blue light for a long period of time causes conditions including eye strain, xerophthalmia, etc. In severe cases, exposure to blue light also damages retinas or crystalline lenses in the eyes. Further, when a display device is used late at night for a long period of time, the blue light causes production of sleep-inducing hormones to be decreased, which interferes with deep sleep and contribute to a variety of physical and mental health problems.

In some cases, schemes for artificially reducing the amount of blue light are used. For example, a blue light signal component of a light source is adjusted or a filter which physically blocks the transmission of the blue light signal component is used. However, such schemes for reducing the level of blue light cause visual inconvenience to a user who is continuously watching a screen. In some cases, the schemes also cause image quality features to be rapidly changed.

Also, the above schemes are disadvantageous in that the image quality is uniformly changed regardless of the features of images that are currently being displayed, even if there are a great variety of image contents. This makes it difficult to provide optimal image quality suitable for the user, and to adaptively respond to a change in an input image.

SUMMARY

Various embodiments of the present disclosure are directed to a display device and an image processing method thereof, which can adaptively perform color calibration depending on the types of images.

Further, various embodiments of the present disclosure are directed to a display device and an image processing method thereof, which are configured such that, when correction of coordinate values for any one of the components in an RGB color space (i,e., a color gamut) is determined, coordinate values for the remaining components are also corrected to obtain suitable values through color space transformation, thus reducing image quality distortion attributable to color calibration.

Furthermore, various embodiments of the present disclosure are directed to a display device and an image processing method thereof, which can reduce color distortion by minimizing brightness correction when achromatic colors are corrected.

An embodiment of the present disclosure provides for a display device. The display device may include an image processor processing original image data including color coordinate values for R, G, and B components in an RGB color space, and outputting processed original image data as corrected image data, and a display unit outputting an image corresponding to the corrected image data, wherein the image processor sets a corrected color coordinate value for an arbitrary component of the R, G, and B components based on a type of the image, sets corrected color coordinate values for remaining components in accordance with the corrected color coordinate value for the arbitrary component, and generates the corrected image data based on the corrected color coordinate values for the arbitrary component and the remaining components.

The image processor may determine the type of the image based on at least one of a histogram distribution degree and a number of detected edges of the original image data.

The image processor may determine, for a plurality of pixels constituting the original image data, the type of the image in blocks including at least one pixel, and may set a type of an image, determined for a largest number of blocks, as the type of the image corresponding to the image data.

The image processor may not determine the type of the image for a block in which all pixels have an identical grayscale value or an identical color coordinate value.

The type of the image may include at least one of a multimedia image, a webpage image, and a document image.

The image processor may set an amount of correction of the color coordinate value so that, for the multimedia image, the amount of correction of the color coordinate value is less than or equal to a first threshold value, so that, for the webpage image, the amount of correction of the color coordinate value is greater than the first threshold value and is less than or equal to a second threshold value, and so that, for the document image, the amount of correction of the color coordinate value is greater than the second threshold value.

The image processor may apply a correction ratio of the arbitrary component to original color coordinate values for the remaining components, and may then set corrected color coordinate values for the remaining components.

The image processor may set, when an original color coordinate value for the arbitrary component is corrected to the corrected color coordinate value, the corrected color coordinate values for the remaining components so that a Lab color difference between the original image data and the corrected image data is minimized in a Lab color space.

The image processor may apply, when a color corresponding to the original image data is an achromatic color, a weight factor of less than 1 to an L component of the Lab color space, and set, when the original color coordinate value for the arbitrary component is corrected to the corrected color coordinate value, the corrected color coordinate values for the remaining components so that a Lab color difference between the original image data and the corrected image data is minimized in the Lab color space.

The present disclosure provides an image processing method of a display device. The image processing method may include receiving original image data including color coordinate values for R, G, and B components in an RGB color space, outputting corrected image data by processing the original image data, and outputting an image corresponding to the corrected image data, wherein outputting the corrected image data may include setting corrected color coordinate value for an arbitrary component of the R, G, and B components based on a type of the image, setting corrected color coordinate values for remaining components in accordance with the corrected color coordinate value for the arbitrary component, and generating the corrected image data based on the corrected color coordinate values for the arbitrary component and the remaining components.

Outputting the corrected image data may include determining the type of the image based on at least one of a histogram distribution degree and a number of detected edges of the original image data.

Determining the type of the image may include determining, for a plurality of pixels constituting the original image data, the type of the image in blocks including at least one pixel, and setting a type of an image, determined for a largest number of blocks, as the type of the image corresponding to the image data.

Determining the type of the image in blocks may include skipping determination of the type of the image for a block in which all pixels have an identical grayscale value or an identical color coordinate value.

The type of the image may include at least one of a multimedia image, a webpage image, and a document image.

Generating the corrected image data may include setting an amount of correction of the color coordinate value so that for the multimedia image, the amount of correction of the color coordinate value is less than or equal to a first threshold value, for the webpage image, the amount of correction of the color coordinate value is greater than the first threshold value and is less than or equal to a second threshold value, and for the document image, the amount of correction of the color coordinate value is greater than the second threshold value.

Setting the corrected color coordinate values for the remaining components may include applying a correction ratio of the arbitrary component to original color coordinate values for the remaining components, and then setting corrected color coordinate values for the remaining components.

Setting the corrected color coordinate values for the remaining components may include when an original color coordinate value for the arbitrary component is corrected to the corrected color coordinate value, setting the corrected color coordinate values for the remaining components so that a Lab color difference between the original image data and the corrected image data is minimized in a Lab color space.

Setting the corrected color coordinate values for the remaining components may further include when a color corresponding to the original image data is an achromatic color, applying a weight factor of less than 1 to an L component of the Lab color space, and when the original color coordinate value for the arbitrary component is corrected to the corrected color coordinate value, setting the corrected color coordinate values for the remaining components so that a Lab color difference between the original image data and the corrected image data is minimized in the Lab color space.

BRIEF DESCRIPTION OF THE DRAWINGS

FIG. 7 is a flowchart illustrating an image processing method of a display device according to an embodiment of the present disclosure.

FIG. 8 is a flowchart illustrating a correction value setting method of a display device according to an embodiment of the present disclosure.

DETAILED DESCRIPTION

Figure 1:
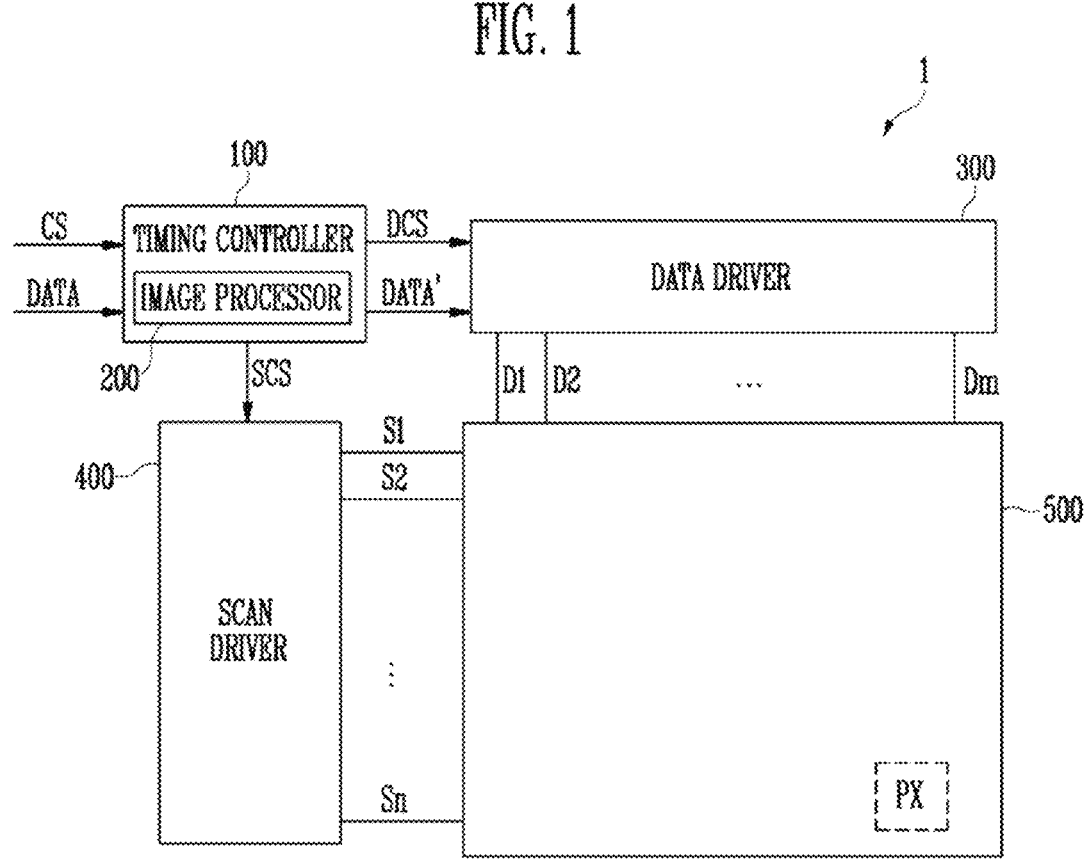
FIG. 1 is a block diagram illustrating the configuration of a display device according to an embodiment of the present disclosure.

Details of various embodiments are included in the detailed descriptions and drawings.

Advantages and features of the present disclosure, and methods for achieving the same will be cleared with reference to embodiments described later in detail together with the accompanying drawings. However, it is to be noted that the present disclosure is not limited to the embodiments but can be embodied in various other ways. In this specification, "connected/coupled" refers to one component not only directly coupling another component but also indirectly coupling another component through an intermediate component. Furthermore, in drawings, portions unrelated to the present disclosure have been omitted to clarify the description of the present disclosure, and the same reference numerals are used throughout the different drawings to designate the same or similar components.

Hereinafter, a display device and an image processing method thereof according to embodiments of the present disclosure will be described in detail with reference to the attached drawings related to the embodiments of the present disclosure.

FIG. 1 is a block diagram illustrating the configuration of a display device according to an embodiment of the present disclosure.

Referring to FIG. 1, a display device 1 according to an embodiment of the present disclosure may include a timing controller 100, a data driver 300, a scan driver 400, and a display unit 500.

The timing controller 100 may receive a control signal CS and image data DATA from an external processor (e.g., an application processor (AP), a mobile AP, a Central Processing Unit (CPU) or a Graphics Processing Unit (GPU)). In various embodiments of the present disclosure, the image data DATA may include coordinate values for respective components in an RGB color space, that is, a red component (R), a green component (G), and a blue component (B) (hereinafter referred to as "color coordinate values"). Further, the image data DATA may additionally include coordinate values for a white component (W).

The timing controller 100 may generate a scan control signal SCS for controlling the scan driver 400 and a data control signal DCS for controlling the data driver 300 in response to the control signal CS. For example, the control signal CS may include a dot clock, a data enable signal, a vertical synchronization signal, and a horizontal synchronization signal. The timing controller 100 may supply the scan control signal SCS to the scan driver 400, and may supply the data control signal DCS to the data driver 300.

In various embodiments of the present disclosure, the timing controller 100 may include an image processor 200. The image processor 200 may determine the type of an image based on the features of the image data DATA, and may determine color calibration for the image data DATA in accordance with the determined image type. In an embodiment, the image processor 200 may also determine color calibration for image data DATA based on input by a user and/or measurement values obtained by a separately provided sensor or the like.

The image processor 200 may set a corrected color coordinate value for any one of individual components of the image data DATA based on the determination of color calibration. Also, the image processor 200 may set corrected color coordinate values for the remaining components through color space transformation. In an embodiment, when it is determined that a color to be represented by the image data DATA is an achromatic color, the image processor 200 may prevent color distortion by applying a weight factor to color coordinate values indicating brightness of the corrected image data DATA'.

In the present disclosure, although the image processor 200 has been described as being integrated into the timing controller 100, the technical spirit of the present disclosure is not limited thereto. In various embodiments, the image processor 200 may be provided as an independent component separate from the timing controller 100.

A detailed operation of the image processor 200 will be described later with reference to FIGS. 2 to 6.

The timing controller 100 may output the image data DATA' corrected by the image processor 200.

The data driver 300 may receive the data control signal DCS and the corrected image data DATA' from the timing controller 100. The data driver 300 may generate data signals using the corrected image data DATA', and may supply the data signals to the pixels PX of the display unit 500 through data lines D1 to Dm.

The scan driver 400 may supply scan signals to scan lines S1 to Sn in response to the scan control signal SCS. For example, the scan driver 400 may supply the scan signals to the scan lines S1 to Sn.

The display unit 500 includes the pixels PX. The pixels PX may be coupled to the data lines D1 to Dm and the scan lines S1 to Sn. For example, the pixels PX may be arranged at intersections of the data lines D1 to Dm and the scan lines S1 to Sn in a matrix form. The pixels PX may be supplied with the data signals and the scan signals through the respective data lines D1 to Dm and the respective scan lines S1 to Sn, and may be implemented as a backlight unit or as a self-emissive panel structure.

Figure 2:
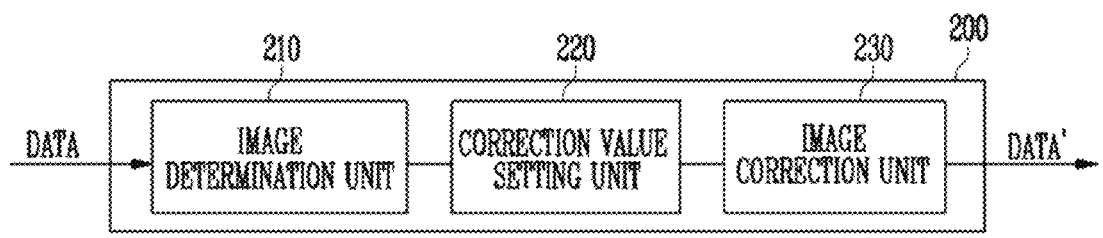
FIG. 2 is a block diagram illustrating the configuration of an image processor according to an embodiment of the present disclosure.

FIG. 2 is a block diagram illustrating the configuration of an image processor according to an embodiment of the present disclosure.

Referring to FIG. 2, the image processor 200 of the display device 1 according to an embodiment of the present disclosure may include an image determination unit 210, a correction value setting unit 220, and an image correction unit 230.

According to the present disclosure the image processor 200 may receive original image data DATA for an image, identify one or more image features based on the image data, determine an image type based on the one or more image features, and perform color correction on the original image data to produce corrected image data DATA', wherein performing the color correction is based on the image type. The display device 1 may then display the image based on the corrected image data DATA'. The one or more image features may include a histogram distribution feature, and edge feature, or both as described.

The image determination unit 210 may analyze at least one of histogram features and edge features of image data DATA, inputted to the timing controller 100, and may then determine the type of an image (e.g., a multimedia image, a webpage image, a document image, or the like) based on the result of the analysis.

Figure 3A:
FIG. 3A to FIG. 3C are diagrams illustrating examples of histogram features depending on the types of images.
Figure 3A:
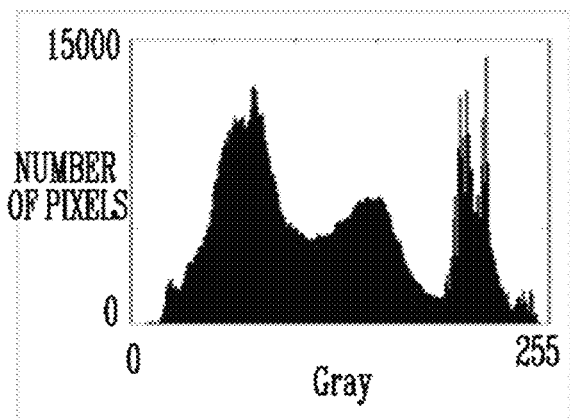
Figure 3B:
Figure 3B:
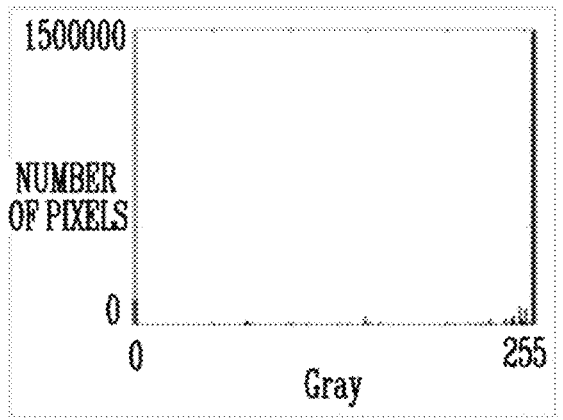
Figure 3C:
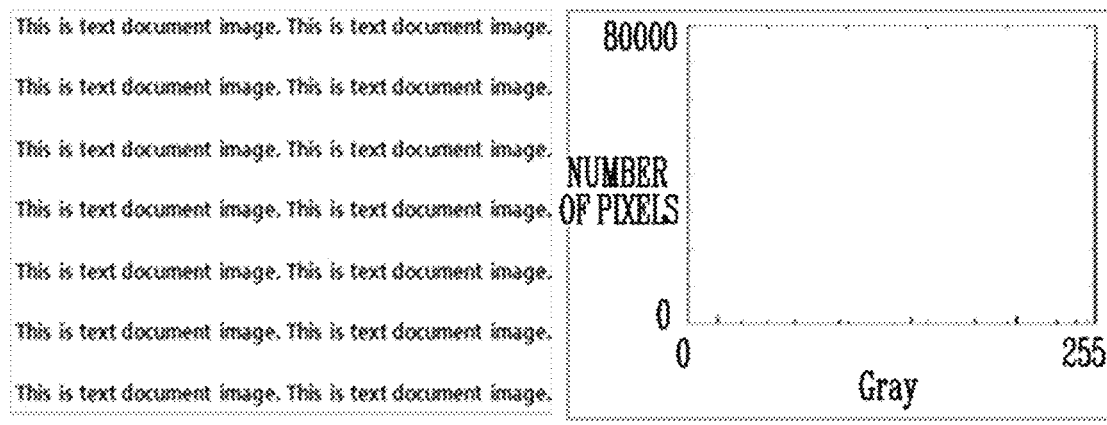

In detail, the image determination unit 210 may analyze a histogram distribution degree. For example, the image determination unit 210 may analyze the histogram distribution degree of the image data. DATA using an algorithm such as Shannon entropy. Generally, since a multimedia image contains various colors and shades, histogram values appear relatively uniformly across gray value intervals, as illustrated in FIG. 3A. Even in the case of a webpage image including images, histogram values appear in multiple gray value intervals, as illustrated in FIG. 3B. However, in the case of a text-based image such as a document image, histogram values lean towards a specific portion of gray values, as illustrated in FIG. 3C. Therefore, the image determination unit 210 may determine the degree to which the histogram values of the corresponding image data DATA are distributed across gray value intervals. That is, the image determination unit 210 may determine a histogram distribution degree in order to categorize images.

In some examples, multimedia images may have histogram values that lean towards different subsets of gray values in different circumstances. Therefore, the image determination unit 210 may more accurately determine the type of an image by analyzing edge features together with the histogram features.

The image determination unit 210 may detect strong edges and weak edges within the image data DATA using an edge detection algorithm, such as Robert, Sobel, Prewitt, Compass, Laplacian, Laplacian of Gaussian (LoG), Difference of Gaussian (DoG), or Canny. For example, the image determination unit 210 may analyze the image data DATA, may identify areas in which image feature values (e.g., grayscale values or color coordinate values) are sharply changed between neighboring pixels as edges, and may detect strong edges and weak edges based on the degree of changed values in the edges.

Generally, a text-based image has more strong edges than weak edges, and a multimedia image has a comparatively similar number of number strong edges and weak edges. Therefore, the image determination unit 210 may determine the ratio of the detected number of strong edges to the detected number of weak edges (i.e., R=number of strong edges/number of weak edges).

Thus, the image determination unit 210 may determine the type of an image from the above-described histogram features and edge features. For example, when the histogram distribution degree is less than 0.3 and the ratio R of the number of strong edges to the number of weak edges is greater than 2, the image determination unit 210 may determine that the corresponding image is a text-based document.

The image determination unit 210 may identify the above-described histogram features and edge features sequentially. In this case, either set of features may be determined first. Alternatively, the image determination unit 210 may identify the above-described histogram features and edge features simultaneously.

In other embodiments, the image determination unit 210 may also determine the image type by identifying only one of histogram features and edge features. In other embodiments, the image determination unit 210 may also determine the type of an image using additional image analysis techniques other than techniques based on the above-described histogram features and edge features.

In various embodiments of the present disclosure, the image determination unit 210 may perform the above-described image determination on the image data DATA in blocks of a preset size (i.e., block-unit determination). For example, the image determination unit 210 may determine an image type by analyzing histogram features and edge features in 30×10 pixel blocks.

In this embodiment, the image determination unit 210 may set the overcall image type based on which image type has been determined for the largest number of blocks as a result of the block-unit determination. Alternatively, in this embodiment, the image determination unit 210 may utilize preset conditions for the histogram features and edge features. That is, the image data DATA may be determined to have a particular image type if it meets a condition regarding the number of blocks satisfying the preset conditions corresponding to that image type. For example, a condition may specify that a number of blocks meeting a condition related to histogram features or edge features is equal to or greater than a threshold ratio (e.g., 10%) of the total number of blocks.

Figure 4:
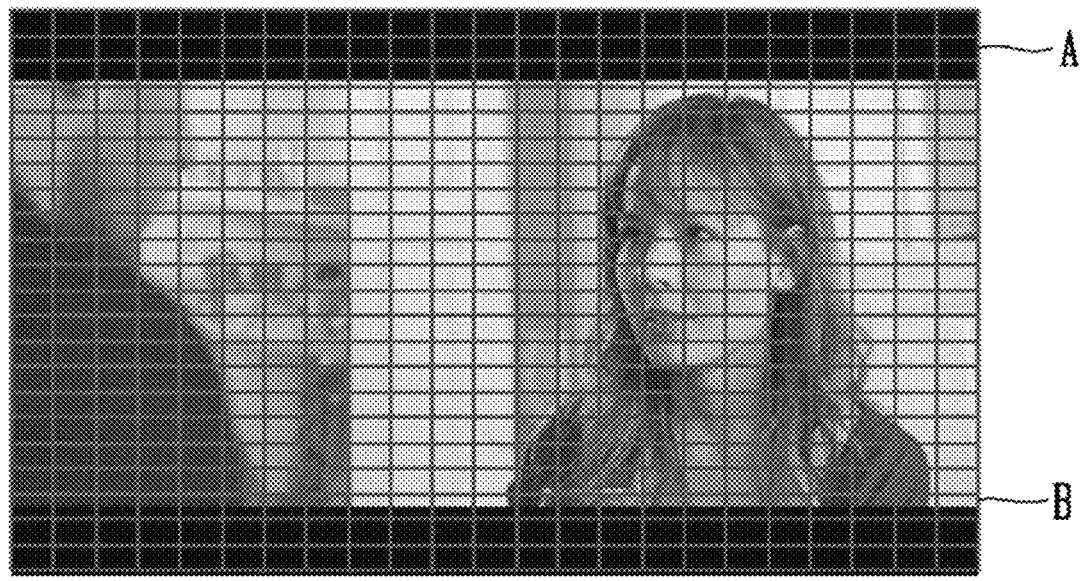
FIG. 4 is a diagram illustrating a block-unit image determination method according to an embodiment of the present disclosure.

In some cases, the accuracy of the image determination may depend on the location of each block within the entire image. For example, as illustrated in FIG. 4, when the resolution of a multimedia image is different from that of the display unit 500, a block A including only black areas in upper and lower portions of the entire image may be analyzed to have a histogram distribution degree of 0 and to have no edges. Thus, the corresponding image may be determined to be a document. Alternatively, a block B including a boundary between the black areas in the upper and lower portions of the entire image and the area of the multimedia image may be analyzed to have a low histogram distribution degree and to have a strong edge detected, and thus the corresponding image may be determined to be a document. Such a result may cause an inaccurate image type determination.

Therefore, when all pixels in a certain block have the same grayscale value or color coordinate value, the image determination unit 210 may not perform image determination on the certain block. That is, blocks such as block A may be excluded from the image type determination because they are all black.

The correction value setting unit 220 may set the degree of color calibration of the image data DATA depending on the image type determined by the image determination unit 210. Generally, the user of the display device 1 is more sensitive to a change in image quality when viewing a multimedia image, and is less sensitive to a change in image quality when viewing a document. Therefore, the correction value setting unit 220 may determine whether (and how much) to correct the image data DATA depending on the image type, and may set the degrees of correction of RGB components of the image data DATA when it is determined to correct the image data DATA.

Since users may be more sensitive to a change in image quality for multimedia images, in some cases the image data DATA of the multimedia image may not be corrected. In other cases, the image data DATA may be corrected to a smaller degree for a multimedia image than for a webpage image or a document image so that the correction is not perceived by the user. On the other hand, since users may be less sensitive to changes in a webpage image or a document image, the image data DATA of a webpage image or a document image may be corrected to a larger degree than for of a multimedia image.

In various embodiments of the present disclosure, the correction value setting unit 220 may set first a corrected color coordinate value for an arbitrary RGB component of the original image data DATA. Aspects of the following disclosure describe a case where the correction value setting unit 220 sets a corrected color coordinate value for a B component (i.e., blue) first. However, the present disclosure may be applied to other cases, such as where a corrected color coordinate value is first set for an R component (red) or a G component (green).

As described above, the correction value setting unit 220 may set the corrected color coordinate value for the B component based on the image type. For example, when the image data DATA is related to a multimedia image, the correction value setting unit 220 may set the corrected color coordinate value for the B component so that the difference between the B color coordinate value of the original image data DATA and the B color coordinate value of corrected image data DATA' is not greater than (i.e., is less than or equal to) a first threshold value. The first threshold value may be set in advance to ensure that the difference between the original color coordinate value and the corrected color coordinate value falls within a range in which a change in image quality is not perceived by the user for the multimedia image.

When image data DATA is related to a webpage image, the correction value setting unit 220 may set the corrected color coordinate value for the B component so that the difference between the B color coordinate value of the original image data DATA and the B color coordinate value of corrected image data DATA' is not greater than a second threshold value. In some cases, the difference for webpage images may be greater than the first threshold value used for multimedia images.

When the image data DATA is related to a document image, the correction value setting unit 220 may set the corrected color coordinate value of the B component so that the difference between a B color coordinate value of the original image data DATA and the B color coordinate value of corrected image data DATA' is greater than the second threshold value. The second threshold value may be experimentally or intuitively preset as to represent the difference between the original color coordinate value and the corrected color coordinate value which enables sufficient color calibration to be performed for the document image, but enables color calibration to be performed only within a particular range in which a change in image quality is not perceived by the user for the webpage image.

The correction value setting unit 220 may set corrected color coordinate values for the remaining components based on the corrected color coordinate value for the B component. Below, a method of setting the corrected color coordinate values for the remaining components (hereinafter referred to as R and G components) based on the corrected color coordinate value for first component will be described in detail. The first component may be arbitrarily selected, but hereinafter it will be referred to as the B component.

In a first embodiment of the present disclosure, the correction value setting unit 220 may correct color coordinate values for the remaining components in accordance with the correction ratio of the corrected color coordinate value for the first component. When color coordinate values for the original RGB components are $R_0$, $G_0$, and $B_0$, and the ratio of the corrected color coordinate value to the original color coordinate value for the B component is $I_{reduce}$ (%), the corrected color coordinate values $R_r$, $G_r$, and $B_r$ of the corrected RGB components for the RGB components are represented by the following Equation (1):

$$\begin{bmatrix} R_r \\ G_r \\ B_r \end{bmatrix} = \begin{bmatrix} R_0 \\ G_0 \\ B_0 \end{bmatrix} \times \left(1 - \frac{I_{reduce}}{100}\right) \quad (1)$$

In a second embodiment of the present disclosure, the correction value setting unit 220 may set corrected color coordinate values for the remaining components using color space transformation. For example, the correction value setting unit 220 may transform RGB color coordinate values of the image data DATA into color coordinate values in a CIELAB color space (i.e., a Lab color space). The Lab color space is composed of coordinate values for an 'L' component, an 'a' component, and a 'b' component. 'L' indicates brightness such that 0 indicates black and 100 indicates white, 'a' indicates chromaticity such that a positive value indicates red and a negative value indicates green, and 'b' indicates chromaticity such that a positive value indicates blue and a negative value indicates yellow.

The correction value setting unit 220 transforms the RGB color coordinate values into color coordinate values in an XYZ space using a preset transformation matrix M, as given by the following Equation (2). The transformed color coordinate values may be transformed back into color coordinate values in the Lab color space depending on the following Equation (3):

$$\begin{bmatrix} X \\ Y \\ Z \end{bmatrix} = M \begin{bmatrix} R \\ G \\ B \end{bmatrix} = \begin{bmatrix} 0.4125 & 0.3576 & 0.1804 \\ 0.2127 & 0.7152 & 0.0722 \\ 0.0193 & 0.1192 & 0.9503 \end{bmatrix} \begin{bmatrix} R \\ G \\ B \end{bmatrix} \quad (2)$$

$$L = 100\left(\frac{Y}{Y_n}\right)^{1/3} \quad (3)$$

$$a = 500\left[\left(\frac{X}{X_n}\right)^{1/3} - \left(\frac{Y}{Y_n}\right)^{1/3}\right]$$

$$b = 200\left[\left(\frac{Y}{Y_n}\right)^{1/3} - \left(\frac{Z}{Z_n}\right)^{1/3}\right]$$

In Equation (3), $X_n$=95.074, $Y_n$=100.000, and $Z_n$=108.883. In different embodiments, the values of the matrix elements in Equation (2) and Equation (3) may be modified based on experimental or intuitive information.

The correction value setting unit 220 may set the color coordinate values for the remaining components so that a Lab color difference (chrominance) between the original image data DATA and the corrected image data DATA', that is, a distance between Lab color coordinate values thereof, is minimized based on the corrected color coordinate value for the B component. The Lab color difference is defined by the following Equation (4):

$$W = \sqrt{|L_0 - L_r|^2 + |a_0 - a_r|^2 + |b_0 - b_r|^2} \quad (4)$$

where W denotes a color difference, $L_0$, $a_0$, and $b_0$ denote Lab color coordinate values of the original image data DATA, and $L_r$, $a_r$, and $b_r$ denote Lab color coordinate values of the corrected image data DATA'.

Referring to Equation (2), a Z component in the XYZ color space is set by 0.0193R+0.1192G+0.9503B, and thus the B component in the RGB color space may be approximated to the B component in the RGB color space (□0.9503B). The correction value setting unit 220 may approximate a Z value based on the corrected color coordinate value for the B component which has been preset, and may then set the Z value to a fixed value.

In a state in which the Z value is fixed, the correction value setting unit 220 may set X and Y values that minimizes the color difference between the original image data DATA and the corrected image data DATA'. From Equation (4), the X and Y values may be set by the following Equations (5) and (6):

$$X_r = \left[\left(\frac{X_n}{Z_n}\right)^{1/3} \frac{200^2}{100^2 + 200^2}(Z_r^{1/3} - Z_0^{1/3}) + X_0^{1/3}\right]^3 \quad (5)$$

$$Y_r = \left[\left(\frac{Y_n}{Z_n}\right)^{1/3} \frac{200^2}{100^2 + 200^2}(Z_r^{1/3} - Z_0^{1/3}) + Y_0^{1/3}\right]^3 \quad (6)$$

In Equations (5) and (6), $X_0$, $Y_0$, and $Z_0$ denote the XYZ color coordinate values of the original image data. DATA, and $X_r$, $Y_r$, and $Z_r$ denote the XYZ color coordinate values of the corrected image data DATA'. Here, as described above, $Z_r$ is a value preset based on the corrected color coordinate value for the B component.

The correction value setting unit 220 may set the corrected color coordinate values for the RGB components by inversely calculating Equation (2) based on the $X_r$ and $Y_r$ values, which are set by Equations (5) and (6), and the $Z_r$ value, which is preset, as described above. The RGB color coordinate values, inversely calculated from the $X_r$, $Y_r$, and $Z_r$ values, may be represented by the following Equation (7):

$$\begin{bmatrix} R' \\ G' \\ B' \end{bmatrix} = B \begin{bmatrix} 3.2405 & -1.5371 & -0.4985 \\ -0.9693 & 1.8760 & 0.0416 \\ 0.0556 & -0.2040 & 1.0572 \end{bmatrix} \begin{bmatrix} X_r \\ Y_r \\ Z_r \end{bmatrix} \quad (7)$$

where R', G', and B' denote finally corrected color coordinate values for RGB components.

The corrected color coordinate value for the B component, set by Equation (7), may be different from the corrected color coordinate value for the B component which has been preset, but the difference may not be large. In accordance with an embodiment, the correction value setting unit 220 may select for the B component the corrected color coordinate value which has been preset, or the corrected color coordinate value which is set by Equation (7).

In the above description, an example in which the correction value setting unit 220 uses transformation into the Lab color space has been described, but the technical spirit of the present disclosure is not limited thereto, and transformation into various color spaces, such as a u'v' color space or a CIE2001 color space, as well as the CIELAB color space, may be used.

In a third embodiment of the present disclosure, when a color corresponding to image data DATA is an achromatic color, the correction value setting unit 220 may set a corrected color coordinate value by applying a weight factor to brightness correction so that the brightness of corrected image data DATA' is reduced.

Figure 5A:
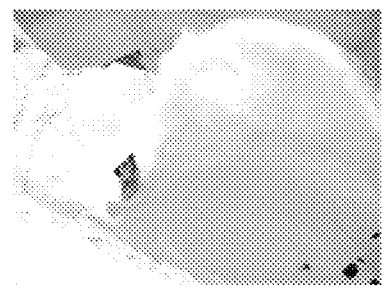
FIG. 5A to FIG. 5C are diagrams for explaining achromatic color correction according to an embodiment of the present disclosure.
Figure 5B:
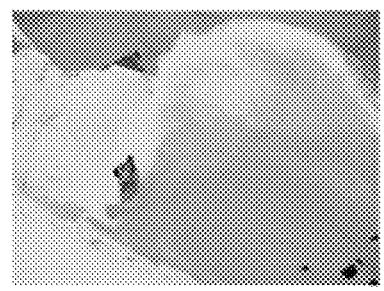

In the case of the achromatic color, when RGB color coordinate values are corrected at the same ratio, great color distortion appears, as illustrated in FIG. 5B, compared to an original image (i.e., FIG. 5), which may cause the user to feel great deterioration of image quality. Therefore, when the image data DATA is corrected for the achromatic color, the present disclosure may minimize the deterioration of image quality which is visually felt by relatively reducing an L component indicating brightness.

For this operation, the correction value setting unit 220 determines whether a color to be represented by the image data DATA is an achromatic color (or is approximate to an achromatic color). The achromatic color is characterized in that differences between the color coordinate values for respective RGB components are not large. Therefore, the correction value setting unit 220 may determine whether the color to be presented by the image data DATA is an achromatic color, based on whether achromaticity S, set by the following Equation (8), is less than or equal to a preset threshold value. Generally, the maximum value of the achromatic color may be 510, and the threshold value may be set to 200 in this embodiment.

$$S = |R-G| + |G-B| + |B-R| \quad (8)$$

When the color corresponding to the image data DATA is an achromatic color, the correction value setting unit 220 sets a weight factor for an L component. The weight factor may be set in accordance with the determined achromaticity S, and may be set in advance in inverse proportion to the achromaticity S, as illustrated in FIG. 6.

Figure 6:
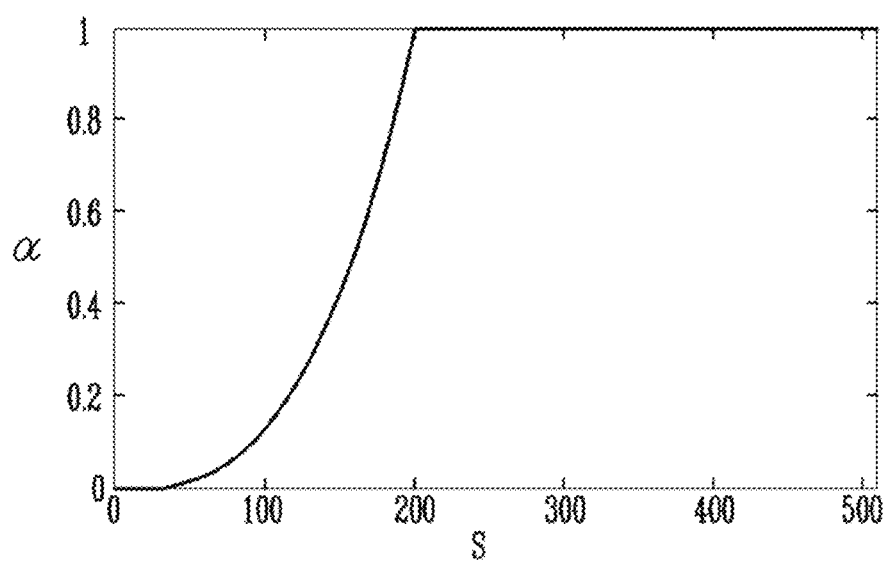
FIG. 6 is a graph illustrating weight factors set in response to achromaticity according to an embodiment of the present disclosure.

As illustrated in FIG. 6, in an embodiment of the present disclosure, when the achromaticity S is greater than a threshold value of 200, the correction value setting unit 220 may set the weight factor to '1'. In contrast, when the achromaticity S is less than the threshold value of 200, the correction value setting unit 220 may set the weight factor to a value preset in accordance with the achromaticity S. This may be represented by the following Equation (9):

$$\alpha = \begin{cases} \beta^{\frac{1}{3}S^3}, & 0 \leq S \leq \beta \\ 1, & \beta \leq S \leq 510 \end{cases} \quad (9)$$

where α denotes the weight factor, β denotes the threshold value of 200 and S denotes achromaticity.

Although FIG. 6 illustrates a case where the threshold value is set to 200, the threshold value may be set to a value other than 200 in various embodiments of the present disclosure.

In the second embodiment of the present disclosure, when the weight factor is applied to Equation (3), Equations (5) and (6) are changed to the following Equations (10) and (11), respectively.

$$X_r = \left[ \left( \frac{X_n}{Z_n} \right)^{1/3} \frac{200^2}{(100\alpha)^2 + 200^2} (Z_r^{1/3} - Z_0^{1/3}) + X_0^{1/3} \right]^3 \quad (10)$$

$$Y_r = \left[ \left( \frac{Y_n}{Z_n} \right)^{1/3} \frac{200^2}{(100\alpha)^2 + 200^2} (Z_r^{1/3} - Z_0^{1/3}) + Y_0^{1/3} \right]^3 \quad (11)$$

The correction value setting unit 220 may set the corrected color coordinate values for RGB components from Equation (7) based on $X_r$ and $Y_r$ values, set by Equations (10) and (11), and the preset $Z_r$ value.

Figure 5C:

In accordance with the third embodiment of the present disclosure, as illustrated in FIG. 5C, color distortion in the corrected image data DATA' is reduced compared to a case where a weight factor is not applied to brightness correction (i.e., FIG. 5B).

In an additional embodiment of the present disclosure, when the display unit 500 has a structure including a backlight unit, the correction value setting unit 220 may further set a correction value for correcting the luminance of the backlight unit of the display unit 500. For example, the correction value setting unit 220 sets the correction value so that the luminance of the backlight unit is reduced for a multimedia image for which the user is sensitive to a change in image quality, thus minimizing the perception of a change in image quality by the user.

The image correction unit 230 corrects the original image data DATA by applying the corrected color coordinate values for the RGB components, set by the correction value setting unit 220. The image correction unit 230 may output the corrected image data DATA' to the data driver 300.

FIG. 7 is a flowchart illustrating an image processing method of a display device according to an embodiment of the present disclosure.

Referring to FIG. 7, when image data DATA is received at step 701, the display device 1 according to an embodiment of the present disclosure may determine the type of an image depending on the image data DATA at step 702. In various embodiments of the present disclosure, the display device 1 may determine the type of the image (e.g., a multimedia image, a webpage image, a document image, etc.) based on the histogram features, edge features, or the like of the image data DATA.

The display device 1 may set a correction method for the image data DATA depending on the determined image type at step 703. For example, the display device 1 may determine whether to correct the image data DATA depending on the image type. In an example, the display device 1 may not correct the image data DATA for a multimedia image.

Further, the display device 1 may determine which one of RGB color coordinate values of the image data DATA is to be corrected first. In an example, the display device 1 may determine to correct first the color coordinate value for a B component so as to reduce blue light.

In addition, for example, the display device 1 may determine whether to additionally correct the luminance of a backlight for the image data DATA.

The display device 1 may set corrected color coordinate values of the image data based on the set correction method at step 704. The display device 1 may set a corrected color coordinate value for an arbitrary component of RGB components of the image data DATA depending on the image type, and may set corrected color coordinate values for the remaining components thereof using, for example, color space transformation. A method of setting the corrected color coordinate values of the display device 1 will be described in detail later with reference to FIG. 8.

In an embodiment, when the display device 1 determines to correct the luminance of a backlight, the display device 1 may additionally set a correction value for correcting the luminance of the backlight.

The display device 1 may correct the image data DATA based on the corrected color coordinate values of the image data DATA at step 705. The display device 1 may output corrected image data DATA' obtained through correction, and then display the corrected image data DATA' on the display unit 500.

FIG. 8 is a flowchart illustrating a correction value setting method of a display device according to an embodiment of the present disclosure.

Referring to FIG. 8, the correction value setting unit 220 of the display device 1 according to an embodiment of the present disclosure may set a corrected color coordinate value for an arbitrary component of RGB components of image data DATA at step 801. In an embodiment, the display device 1 may set a corrected color coordinate value for the arbitrary component depending on the image type.

Next, the display device 1 sets corrected color coordinate values for the remaining components at step 802.

In a first embodiment of the present disclosure, the display device 1 may set corrected color coordinate values for the remaining components by equally applying the correction ratio of the color coordinate value for the arbitrary component to the remaining components.

In a second embodiment of the present disclosure, the display device 1 may transform image data DATA into a Lab color space, and may set the corrected color coordinate values for the remaining components, which minimize a Lab color difference between the image data DATA and the corrected image data DATA' based on the corrected color coordinate value for the arbitrary component.

In a third embodiment of the present disclosure, when a color corresponding to the image data DATA is an achromatic color, the display device 1 may apply a weight factor to an L component of a Lab color space, and may set corrected color coordinate values for the remaining components, which minimizes the Lab color difference between the image data DATA and the corrected image data DATA' based on the corrected color coordinate value for the arbitrary component.

The corrected color coordinate value setting method of the display device 1 is performed in the same manner as that of the above detailed description.

The display device and the image processing method thereof according to an embodiment of the present disclosure considers image features and minimizes image quality distortion and color distortion when applying color calibration technology, as in the case of blue light reduction, thus protecting a viewer's sight and reducing inconvenience when viewing images.

Those skilled in the art to which the present disclosure pertains will understand that the present disclosure may be practiced in other detailed forms without departing from the technical spirit or essential features thereof. Therefore, it should be understood that the above-described embodiments are only exemplary in all aspects rather than being restrictive. It is intended that the scope of the present disclosure should be defined by the accompanying claims rather than the above-described descriptions, and various modifications, additions and substitutions, which can be derived from the meaning, scope and equivalent concepts of the accompanying claims, fall within the scope of the present disclosure.

What is claimed is:

1. A display device, comprising:
an image processor processing original image data including color coordinate values for R, G, and B components in an RGB color space, and outputting processed original image data as corrected image data; and
a display unit including a plurality of pixels, and outputting an image corresponding to the corrected image data onto the plurality of pixels,
wherein the image processor:
sets a corrected color coordinate value for a component of the R, G, and B components based on the type of the image, sets corrected color coordinate values for remaining components in accordance with the corrected color coordinate value for the component, and generates the corrected image data based on the corrected color coordinate values for the component and the remaining components, and
wherein the corrected color coordinate values for the remaining components are set to minimize a difference between the original image data and the corrected image data in a Lab color space.

2. The display device according to claim 1, wherein the image processor determines the type of the image based on at least one of a histogram distribution degree and a number of detected edges of the original image data.

3. The display device according to claim 2, wherein the image processor determines, for a plurality of pixels constituting the original image data, the type of the image in blocks including at least one pixel, and sets a type of an image, determined for a largest number of blocks, as the type of the image corresponding to the original image data.

4. The display device according to claim 3, wherein the image processor excludes the type of the image for a block in which all pixels have an identical grayscale value or an identical color coordinate value.

5. The display device according to claim 1, wherein the type of the image comprises at least one of a multimedia image, a webpage image, and a document image.

6. The display device according to claim 5, wherein the image processor sets an amount of correction of the color coordinate value so that, for the multimedia image, the amount of correction of the color coordinate value is less than or equal to a first threshold value, so that, for the webpage image, the amount of correction of the color coordinate value is greater than the first threshold value and is less than or equal to a second threshold value, and so that, for the document image, the amount of correction of the color coordinate value is greater than the second threshold value.

7. The display device according to claim 1, wherein the image processor applies a correction ratio of the component to original color coordinate values for the remaining components, and then sets corrected color coordinate values for the remaining components.

8. The display device according to claim 1, wherein the image processor applies, when a color corresponding to the original image data is an achromatic color, a weight factor of less than 1 to an L component of the Lab color space, and sets, when the original color coordinate value for the component is corrected to the corrected color coordinate value, the corrected color coordinate values for the remaining components so that the Lab color difference between the original image data and the corrected image data is minimized in the Lab color space.

9. An image processing method of a display device, comprising:
- receiving original image data including color coordinate values for R, G, and B components in an RGB color space;
- outputting corrected image data by processing the original image data; and
- outputting an image corresponding to the corrected image data,
- wherein outputting the corrected image data comprises:
- setting a corrected color coordinate value for a component of the R, G, and B components based on a type of the image;
- setting corrected color coordinate values for remaining components in accordance with the corrected color coordinate value for the component; and
- generating the corrected image data based on the corrected color coordinate values for the component and the remaining components, wherein setting the corrected color coordinate values for the remaining components comprises:
- setting the corrected color coordinate values for the remaining components to minimize a difference between the original image data and the corrected image data in a Lab color space.

10. The image processing method according to claim 9, wherein outputting the corrected image data comprises determining the type of the image based on at least one of a histogram distribution degree and a number of detected edges of the original image data.

11. The image processing method according to claim 10, wherein determining the type of the image comprises:
- determining, for a plurality of pixels constituting the original image data, the type of the image in blocks including at least one pixel; and
- setting a type of an image, determined for a largest number of blocks, as the type of the image corresponding to the original image data.

12. The image processing method according to claim 11, wherein determining the type of the image in blocks comprises skipping determination of the type of the image for a block in which all pixels have an identical grayscale value or an identical color coordinate value.

13. The image processing method according to claim 9, wherein the type of the image comprises at least one of a multimedia image, a webpage image, and a document image.

14. The image processing method according to claim 13, wherein generating the corrected image data comprises setting an amount of correction of the color coordinate value so that:
- for the multimedia image, the amount of correction of the color coordinate value is less than or equal to a first threshold value,
- for the webpage image, the amount of correction of the color coordinate value is greater than the first threshold value and is less than or equal to a second threshold value, and
- for the document image, the amount of correction of the color coordinate value is greater than the second threshold value.

15. The image processing method according to claim 9, wherein setting the corrected color coordinate values for the remaining components comprises:
- applying a correction ratio of the component to original color coordinate values for the remaining components, and then setting the corrected color coordinate values for the remaining components.

16. The image processing method according to claim 9, wherein setting the corrected color coordinate values for the remaining components further comprises:
- when a color corresponding to the original image data is an achromatic color, applying a weight factor of less than 1 to an L component of the Lab color space; and
- when the original color coordinate value for the component is corrected to the corrected color coordinate value, setting the corrected color coordinate values for the remaining components so that the Lab color difference between the original image data and the corrected image data is minimized in the Lab color space.

17. A method of displaying an image, comprising:
- receiving original image data for the image;
- identifying one or more image features based on the original image data;
- determining an image type based on the one or more image features;
- performing color correction on the original image data to produce corrected image data by:
  - setting a corrected color coordinate value for a component of the original image data based on the image type, and
  - setting corrected color coordinate values for remaining components of the original image data to minimize a difference between the original image data and the corrected image data in a color space; and
- displaying the image based on the corrected image data.

18. The method of claim 17, wherein the one or more image features comprise a histogram distribution feature, and an edge feature, or both.

* * * * *